July 11, 1950     W. R. KROMER     2,514,773
FLUID PRESSURE DISPENSER WITH GAS PRESSURE SUPPLYING
RESERVOIR WITHIN THE SUPPLY CONTAINER Filed May 1, 1945     2 Sheets-Sheet 1

INVENTOR.
Wallace R. Kromer
BY
Evans + McCoy
ATTORNEYS

July 11, 1950 W. R. KROMER 2,514,773
FLUID PRESSURE DISPENSER WITH GAS PRESSURE SUPPLYING
RESERVOIR WITHIN THE SUPPLY CONTAINER
Filed May 1, 1945 2 Sheets-Sheet 2

INVENTOR.
Wallace R. Kromer
BY
Evans + McCoy
ATTORNEYS

Patented July 11, 1950

2,514,773

UNITED STATES PATENT OFFICE 2,514,773

FLUID PRESSURE DISPENSER WITH GAS PRESSURE SUPPLYING RESERVOIR WITHIN THE SUPPLY CONTAINER

Wallace R. Kromer, Cleveland Heights, Ohio, assignor to Superflow Manufacturing Corporation, Cleveland, Ohio, a corporation of Ohio Application May 1, 1945, Serial No. 591,321

9 Claims. (Cl. 225—1)

This invention relates to a dispensing device for beer or carbonated beverages and has for its object to provide a dispensing container that is provided with cooling and pressure generating means that are so designed that they occupy but small space within the container and reduce but little the liquid capacity of the container.

A further object is to provide a dispensing container of simple, compact construction having convenient cooling, pressure generating and dispensing devices attached to its top wall and adapted to be disposed wholly within and below the top edge of the chime at the top of the container so that containers embodying the invention may be stored and shipped without damage to the attachments.

An additional object of the invention is to provide a simple and convenient means for utilizing solid carbon dioxide generally known as Dry Ice, to cool the beverage and to create and maintain a pressure within the receptacle that will prevent escape of carbon dioxide from the beverage and that will force the beverage through the tap when the faucet valve is opened.

A further object of the invention is to provide a faucet that can be moved from an inoperative position overlying the top of the container, to an operative position projecting laterally from the container and that is detachably fastened in its inoperative position so that it may be used as a handle for carrying the container.

With the above and other objects in view, the invention may be said to comprise the liquid dispensing device as illustrated in the accompanying drawings, hereinafter described and particularly set forth in the appended claims, together with such variations and modifications thereof as will be apparent to one skilled in the art to which the invention pertains.

Reference should be had to the accompanying drawings forming a part of this specification, in which.

Figure 1:
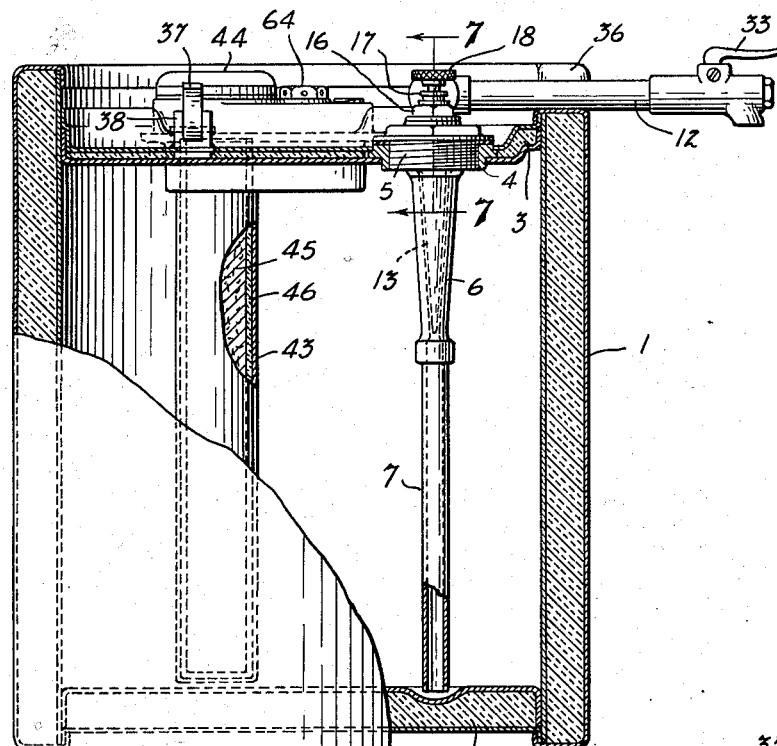
Figure 1 shows the container embodying the invention partly in side elevation and partly in vertical section on the line indicated at 1—1 in Fig. 2.
Figure 3:
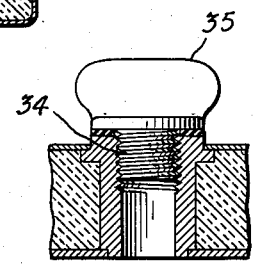
Fig. 3 is a fragmentary section taken on the line indicated at 3—3 in Fig. 2.

The cooling and dispensing devices of the present invention are shown in the accompanying drawings applied to a beverage receptacle having a cylindrical wall 1, a bottom wall 2 and a top wall 3 which are preferably of heat insulating construction. The top wall 3 has a bung hole through an internally threaded ring 4 that is closed by a threaded bung 5. The bung 5 supports a tubular tap rod the upper portion 6 of which is formed integrally with the bung and tapers downwardly, the tap rod having a lower portion 7 open at its lower end adjacent the bottom of the container and attached to the integral portion 6. The bung 5 is provided with a shoulder 8 and a sealing washer 9 is confined between the shoulder 8 and the ring 4. The tubular tap rod carried by the bung 5 communicates with a passage 10 in the bung that extends into a laterally extending arm 11 to which a suitable faucet 12 is pivoted. A needle valve 13 is mounted in the tapered portion 6 of the tap rod and serves to close the tap rod passage and to regulate the pressure of the beverage at the faucet. The valve 13 has a stem 14 provided with a threaded portion 15 that is screwed into a collar 16 secured in an opening in the bung 5 that is alined with the tap rod. The stem 14 projects through a gland 17 in the collar 16 and has a handle 18 at its upper end by means of which the valve 13 may be adjusted to close the tap and prevent leakage of liquid or gas through the tap or to regulate the pressure at the faucet.

The laterally extending faucet supporting arm 11 has a cylindrical end portion 22 and a recessed shoulder 23 at the inner end of the said cylindrical portion, the recess of the shoulder 23 receiving a sealing washer 24. The cylindrical portion 22 has a lateral opening 25 and a T fitting 26 carried by the faucet 12 at its inner end is rotatably mounted on the cylindrical end portion 22 of the arm 11, the fitting 26 having an opening 27 that is adapted to register with the opening 25 in one position of the faucet. The opening 25 is upon the outer side of the arm 11 so that the opening 27 to the faucet registers therewith when the faucet is swung to its operative position extending laterally from the container.

The fitting 26 is retained on the arm 11 by means of a cap 28 that is held in place by a screw 29 that has threaded engagement with the interior of the tubular cylindrical end 22 of the arm. The cap 28 carries a sealing washer 30 that engages the outer end of the fitting 26 and the cap 28 is locked against turning movement with respect to the arm 11 by means of a projection 31 on the end of the cylindrical portion 22 of the arm that engages in a recess 32 formed in the cap.

Figure 2:
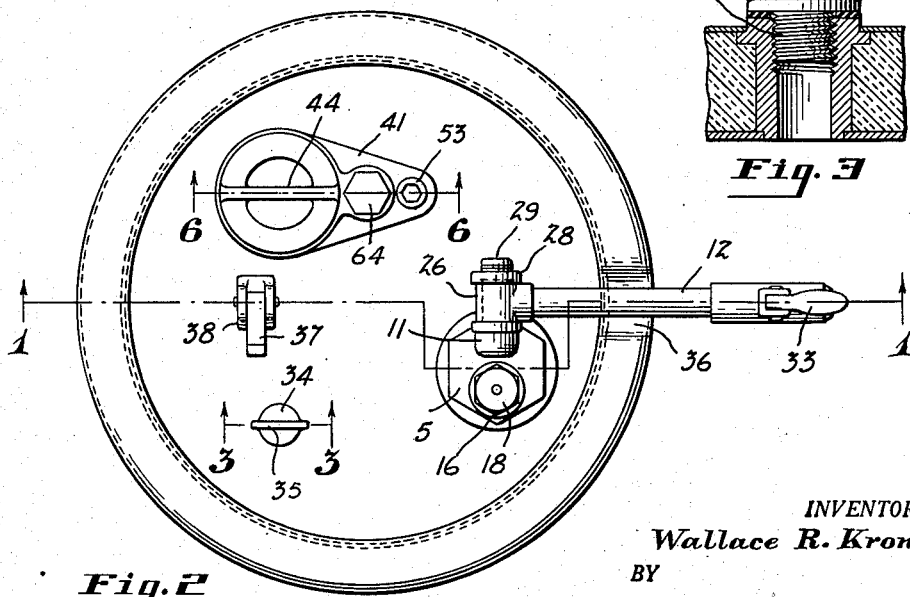
Fig. 2 is a top plan view of the container.

The openings 25 and 27 register when the faucet is swung outwardly to its operative position as shown in Figs. 1 and 2. The faucet 12 is provided with a suitable manually operable valve 33 which controls the discharge of the beverage when the faucet is in its operative position.

For convenience in filling the container, the top 3 is preferably provided with a vent opening that is closed by a threaded plug 34 that is provided with a wing head 35 so that it may be conveniently removed to provide a vent for free escape of air while the beverage is flowing into the container.

Figure 4:
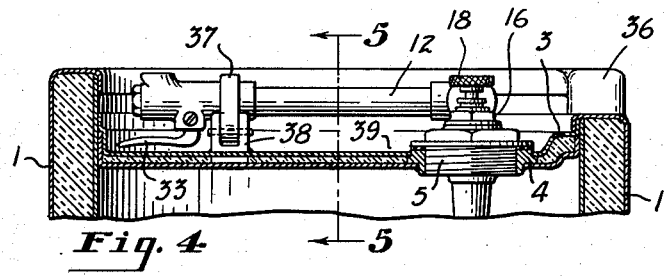
Fig. 4 is a fragmentary vertical section through the top of the container showing the faucet folded into inoperative position on the top of the container.
Figure 5:
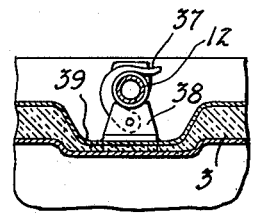
Fig. 5 is a fragmentary section taken on the line indicated at 5—5 in Fig. 4.
Figure 6:
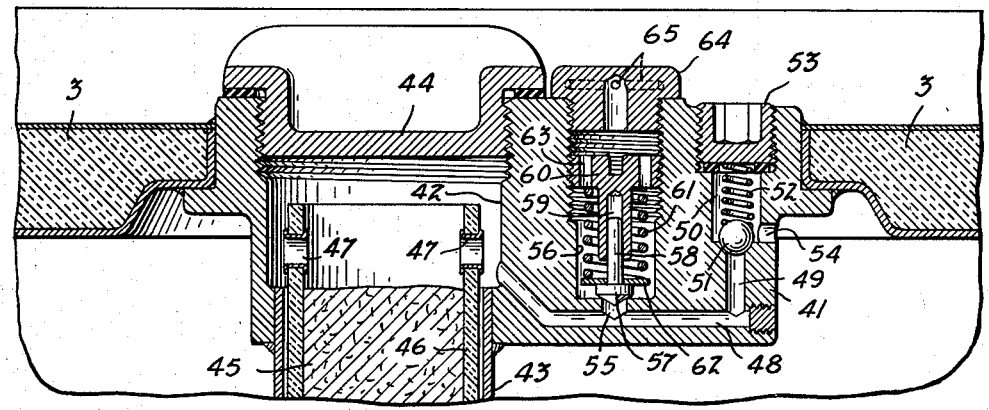
Fig. 6 is a fragmentary section on an enlarged scale taken on the line indicated at 6—6 in Fig. 2.
Figure 7:
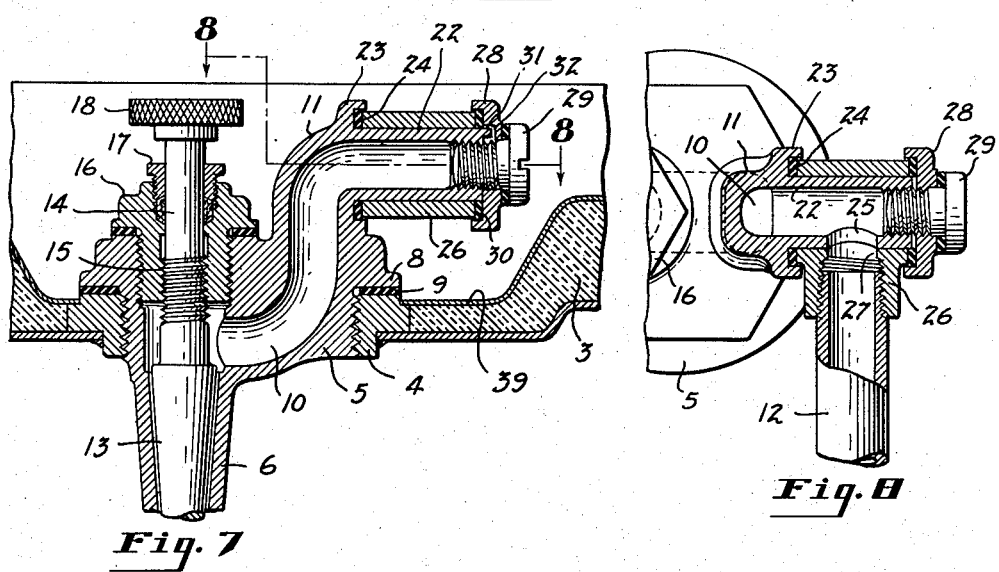
Fig. 7 is a section on an enlarged scale taken on the line indicated at 7—7 in Fig. 1.
Figure 8:
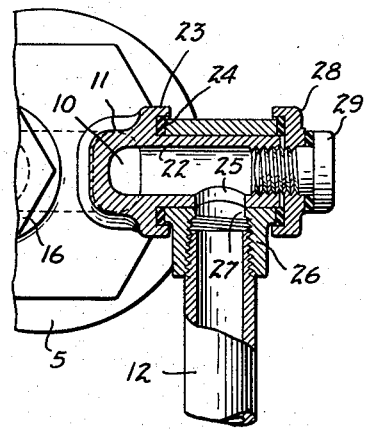
Fig. 8 is a section taken on the line indicated at 8—8 in Fig. 7.

The top wall 3 of the container is inset from the top edge of the container so that the projecting portion of the peripheral wall 1 provides a relatively deep chime at the top of the container. The faucet supporting portion of the laterally projecting arm 11 of the bung 5 is located below the top edge of the chime and in order to permit the faucet 12 to be swung outwardly to its horizontal operative position, the chime is provided with a slot 36 adapted to receive the faucet 12. The faucet 12 is adapted to be swung from a horizontal operative position shown in Fig. 4, the length of the faucet being such that it lies wholly within the chime of the container when swung to its inoperative position. Means is provided for detachably retaining the faucet 12 in its inoperative position and this means comprises a hook 37 that is pivoted to a bracket 38 attached to the top 3. In order to accommodate the faucet 12 in its folded inoperative position the top 3 may be provided with a recess 39 extending diametrically across the same in line with the slot 36 so that the faucet is positioned in the recess when in folded position. The recess 39 provides sufficient space between the body of the faucet 12 and the top of the container to permit the faucet to be conveniently gripped and used as a handle for carrying the container and the faucet pivot is positioned below the top edge of the chime so that the faucet when folded is entirely below the top edge of the chime.

The cooling and pressure generating means is carried by a casting 41 that is secured in an opening in the top 3 formed to receive it and this casting is provided with a bung hole 42 to the lower end of which is attached a depending cylindrical well 43. The bung hole 42 is closed by means of a threaded bung 44 and the well 43 provides a receptacle to receive a Dry Ice cartridge 45 that is of cylindrical form and of a size to be inserted through the bung hole 42 into the well 43. The cartridge 45 is filled with Dry Ice and preferably has a wall 46 formed of suitable insulating material to retard the transfer of the heat from the beverage to the Dry Ice within the cartridge. The cartridge is open at the top so that the space between the bung 44 and the Dry Ice of the cartridge forms a chamber which receives the carbon dioxide produced by evaporation of the Dry Ice.

To facilitate the removal of the cartridge from the container, the upper end of the wall 46 is preferably provided with diametrically opposite openings in which metal eyelets 47 are mounted. The openings in the eyelets 47 are adapted to receive a suitable tool for lifting the cartridge out of the container.

A passage 48 extends laterally through the casting 41 from the bung hole 42 and has an end portion 49 that is vertically disposed and opens into a valve chamber 50 formed by a vertical bore in the casting 41. A ball check valve 51 normally closes the upper end of the passage 49 and is yieldingly held in closed position by means of a coil spring 52 that is interposed between the ball and a threaded stop plug 53 that closes the upper end of the chamber 50. A lateral passage 54 connects the valve chamber 50 with the interior of the container immediately adjacent the under side of the top wall 3. The check valve 51 is adapted to be opened by pressure of the carbon dioxide issuing from the cartridge 45 but prevents the passage of liquid from the container to the carbon dioxide chamber.

Between the valve 51 and the carbon dioxide chamber, a lateral opening 55 communicates with the passage 48 and opens into a valve chamber 56 formed by a vertical bore in the casting 41. A valve 57 closes the opening 55 and has a stem 58 that is slidably received in a bore 59 formed in a threaded stop plug 60 that is screwed into the upper end of the bore that forms the chamber 56. The valve 57 is held in closed position by means of a coil spring 61 that is interposed between the plug 60 and a washer 62 carried by the valve. The tension of the spring 61 may be adjusted as desired by adjustment of the backing plug 60 to establish a desired maximum pressure that may exist within the container. The adjustable plug 60 is provided with openings 63 that allow escape of gas from the chamber 56 and the upper end of the threaded bore in which the plug 60 is mounted is closed by means of a second plug 64 that has openings 65 to permit escape of gas to the atmosphere. The valve 55 provides a pressure relief valve which allows gas to escape from the passage 48 to the atmosphere whenever the pressure of the gas exceeds a predetermined amount so that pressure on the beverage in the container may be limited to a predetermined maximum.

The thickness of the insulating wall of the cartridge will be such as to provide the desirable rate of heat exchange. The evaporation of the Dry Ice automatically generates a pressure within the container that serves to retain dissolved gas in the liquid that also serves to force the liquid through the tap when the faucet valve is opened so that the container can be substantially completely emptied by the pressure automatically generated within the container. The pressure relief valve prevents the building up of excessive pressure within the container and the check valve prevents contamination of the cooling and pressure regulating means by the liquid in the container.

It is to be understood that variations and modifications of the specific devices herein shown and described for purposes of illustration, may be made without departing from the spirit of the invention.

What I claim is:

1. A liquid discharge device comprising a fluid tight container having a discharge faucet, a member forming a portion of the top wall of the container and having an opening, a well depending from said member beneath said opening and having a fluid tight connection thereto around the opening to form a Dry Ice chamber, a closure for said opening, two valve chambers in said member laterally of said opening and both opening to said Dry Ice chamber, the first of said chambers having a vent to the atmosphere and the second an opening to the interior of the container, a pressure operated relief valve in the first of said chambers to limit the pressure in said Dry Ice chamber, and a check valve in the second of said chambers normally closing the opening to the Dry Ice chamber, said valves being accessible independently of the closure for the well opening from the top of said chamber.

2. A liquid discharge device comprising a fluid tight container having a discharge faucet, a member forming a portion of the top wall of the container and having an opening, a well depending from said member beneath said opening and having a fluid tight connection thereto around the opening to form a Dry Ice chamber, a closure for said opening, two valve chambers in said member laterally of said opening and both opening to said Dry Ice chamber, one of said chambers having a vent to the atmosphere and the other an opening to the interior of the container, a valve in each of said chambers normally closing the openings to the Dry Ice chamber and adapted to be opened by fluid pressure, a spring holding each of said valves in closed position, and adjustable retainers for said springs accessible independently of the closure for the well opening from the top of said member laterally of said closure.

3. A liquid dispensing device comprising a fluid tight container having a discharge faucet, a member forming a part of the top wall of the container and having a bung hole therein, said member having two valve chambers therein laterally of said bung hole and a passage opening to the bung hole and to each of said chambers, one of said chambers having a vent to the atmosphere and the other an opening to the interior of the container, a well attached to said member and forming therewith a Dry Ice chamber, said well having an elongated cylindrical wall with its upper end fitting in said bung hole, a bung detachably secured in said bung hole above said well, an elongated Dry Ice cartridge having a tubular wall of insulating material adapted to fit within the tubular wall of the well, a valve in each of said chambers normally closing the openings to said passage and adapted to be opened by the pressure of fluid in said passage, a spring holding each valve closed, and retainers for said springs accessible independently of the bung for the well opening from the top of said member.

4. In a likuid dispenser in combination with a fluid tight container having a bung opening, a unitary tap rod structure comprising a member receivable in the bung opening, a tubular conduit extending from said member into the interior of the container and having a tapered passage within the container, a valve body disposed in the tapered passage portion, said valve body having a stem extending through the bung opening and supported in said member, the stem being manually operable externally of the container for shifting the valve body longitudinally in the said tapered passage portion to vary the effective cross section of the latter in adjusting the resistance to the flow of liquid therethrough, a faucet carried by the member externally of the container, said faucet having connection through the member with the tubular conduit to receive liquid from the latter.

5. In a liquid dispenser comprising a fluid tight container having means for cooling liquid therein, a tap rod structure carried by one wall of the container and including a member detachably mounted in said wall, a tubular conduit carried by said member and extending into the interior of the container to withdraw liquid therefrom, pressure throttling valve means carried by said member and including a valve body mounted for shifting movement in a portion of said conduit in varying the resistance to the flow of liquid through the conduit, said valve body and conduit portion being disposed substantially wholly within the container so as to be in direct heat exchanging relation to the contents of the container, means carried by said member on the outside of the container and operable manually to shift the valve body in said conduit portion, and a faucet connected to said member on the outside of the container for withdrawing liquid as desired.

6. For use in combination with a fluid tight liquid container having a bung opening in one wall, a tap rod unit for withdrawing liquid from the container, said unit comprising a closure member receivable in the bung opening and means for retaining the same therein, a tubular conduit extending into the container from the closure member and supported by the latter, a valve body and means supporting the same within a portion of the conduit inside the container for longitudinal movement therein, the valve body and the walls of the conduit portion providing a variable area passage substantially wholly surrounded by the container, the supporting means including a stem extending through the closure member and operable externally of the container for moving the valve body in the passage portion and varying the passage area, a faucet connected to the closure member externally of the container, and means providing a liquid passage extending through the closure member connecting the tubular conduit and the faucet.

7. For use in combination with a fluid tight liquid container having a bung opening in one wall, a tap rod unit for withdrawing liquid from the container, said unit comprising a closure member receivable in the bung opening and means for retaining the same therein, a tubular conduit extending into the container from the closure member and supported by the latter, a valve body and means supporting the same within a portion of the conduit for longitudinal movement therein, the valve body and the walls of the conduit portion providing a variable area passage substantially wholly surrounded by the container, the supporting means including a stem extending through the closure member and operable externally of the container for moving the valve body in the passage portion and varying the passage area, and a faucet supported on the closure member externally of the container, the closure member being formed with a liquid passage connecting the tubular conduit and the faucet.

8. A liquid storing, cooling, and dispensing device comprising a fluid tight container having side, bottom and top walls, the side walls extending above the level of the top wall, a Dry Ice well carried by the top wall and extending downwardly into the interior of the container, said well having an opening through the top wall of the container, a removable closure structure for the well opening to retain Dry Ice in the well, said closure structure being disposed wholly below the level of the upper edges of the side walls, valve means controlling the flow of gas from the well into the container and to the atmosphere, a tap rod carried by the container top wall and extending into the container, the upper end of the tap rod being disposed between the top wall and the upper edge level, a faucet pivoted on the upper end of the tap rod to swing between a transit position wholly within the side walls and below said upper edge level and a dispensing position in which the faucet end projects laterally beyond one of the side walls, and a notch in the upper edge of said one side wall to receive the faucet upon movement of the latter to dispensing position.

9. A liquid dispenser comprising a fluid tight container having side, bottom and top walls, the top wall including a central portion recessed below the upper edges of the side walls, a tap rod carried by the top wall and extending downwardly into the container, an elongated faucet pivoted on the upper end of the tap rod and swingable between a transit position in which the faucet extends across substantially the center of the top in spaced relation above said recessed portion and a dispensing position in which the faucet end projects laterally beyond one of the side walls, and hook means carried by the top wall and spaced from the tap rod for latching the faucet in transit position whereby the faucet serves as a carrying handle for the dispenser when latched in transit position.

WALLACE R. KROMER.

REFERENCES CITED

The following references are of record in the file of this patent:

UNITED STATES PATENTS

| Number | Name | Date |
|---|---|---|
| 237,884 | Mainzer | Feb. 15, 1881 |
| 445,257 | Beck | Jan. 27, 1891 |
| 2,021,305 | Harr | Nov. 19, 1935 |
| 2,030,534 | Pfeil | Feb. 11, 1936 |
| 2,104,466 | Marzolf | Jan. 4, 1938 |
| 2,104,467 | Marzolf | Jan. 4, 1938 |
| 2,112,637 | Swem | Mar. 29, 1938 |
| 2,162,842 | Dolison | June 20, 1939 |
| 2,175,284 | Davis | Oct. 10, 1939 |
| 2,187,793 | Rice | Jan. 23, 1940 |

FOREIGN PATENTS

| Number | Country | Date |
|---|---|---|
| 343,619 | Great Britain | Feb. 26, 1931 |
| 816,235 | France | Apr. 26, 1937 |